J. E. POINTON.
BREAD MAKING MACHINERY.
APPLICATION FILED MAR. 26, 1918.

1,335,915.

Patented Apr. 6, 1920.

Inventor
J. E. Pointon.
By H. R. Kerslake
Atty.

UNITED STATES PATENT OFFICE.

JOHN EDWARD POINTON, OF PETERBOROUGH, ENGLAND.

BREAD-MAKING MACHINERY.

1,335,915.  Specification of Letters Patent.  Patented Apr. 6, 1920.

Application filed March 26, 1918. Serial No. 224,793.

*To all whom it may concern:*

Be it known that I, JOHN EDWARD POINTON, subject of the King of Great Britain and Ireland, residing at Brackley, Park Crescent, Peterborough, in the county of Northants, England, have invented certain new and useful Improvements Relating to Bread-Making Machinery, of which the following is a specification.

This invention relates to bread making machinery and has for its object to provide for the more convenient and reliable transit of the bread or loaf portions from the final molding machine, through the final proving chamber and the oven or baking chamber.

The invention comprises the combination with the final proving and baking chambers, of a conveyer adapted to travel in a circuitous path through both of the said chambers and so that the dough portions from the final molding machine when placed on the said conveyer are not removed therefrom or disturbed until as completed baked bread loaves they have passed out with the conveyer from the oven or baking chamber. The invention further comprises the provision of means for the heating up of the conveyer sole plates or trays (as used in the making of cottage loaves or oven bottom bread) as they pass from the proving chamber to the oven.

On the accompanying sheet of explanatory drawings:—

Figure 1:
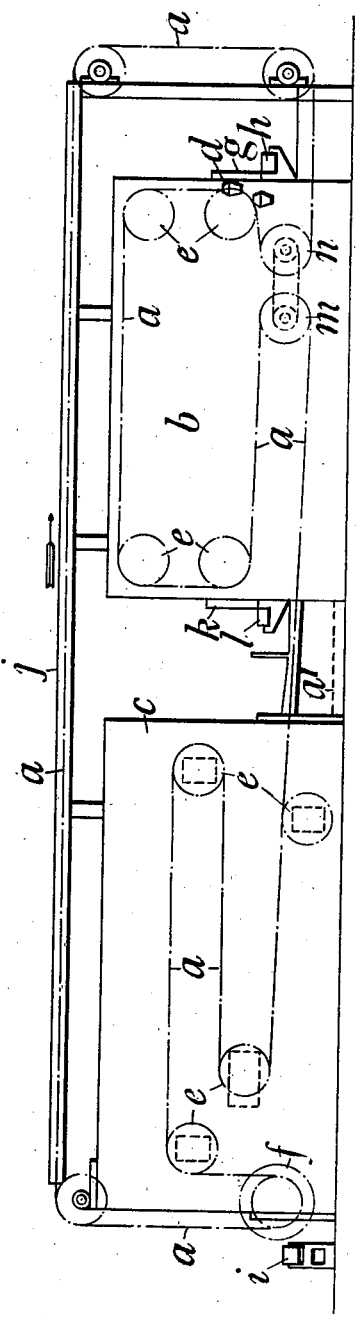
Figure 2:
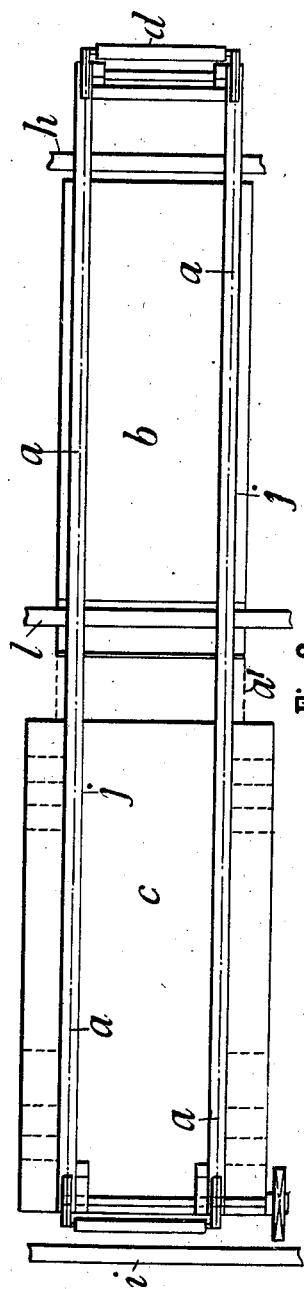

Figure 1 is a side elevation and Fig. 2 a plan representing, in diagram form, bread making machinery in accordance with this invention.

The same reference letters in the two views indicate the same or similar parts.

In the manner of carrying the invention into effect as illustrated by the drawings, the one endless conveyer $a$ which is to pass through both the proving chamber $b$ and the baking chamber $c$ is built up from the usual side links between which are suspended or pivotally mounted the cradles, bridles or the like as $d$, which support the tins employed when making tin loaves, and the sole plates or trays when making cottage loaves or what is known as oven bottom bread. Within both the proving chamber $b$ and the oven or baking chamber $c$ guide wheels or pulleys $e$ are provided to cause the conveyer to travel circuitously or in a zig-zag course through both chambers. The oven or baking chamber is preferably heated by steam pipes or their equivalent, the conveyer being made to travel between or over and under the respective tiers of pipes, tubes or heating elements. The required continuous or intermittent movements are imparted to the conveyer through ordinary driving gear, of which one wheel, $f$, is shown in the drawings.

The proving chamber may have a charging aperture at $g$ through which the dough portions, brought on a belt carrier $h$ from the final molding machine, are inserted and placed on the conveyer cradles $d$, either automatically or by hand. Or the conveyer may be caused to pass outside the proving chamber to be there fed with the finally molded loaves. Each shelf or cradle after being thus charged with dough portions either inside or outside the proving chamber passes circuitously through it and thence to the oven or baking chamber, the dough portions still remaining on the same shelf or in the same cradle as it makes its circuitous course through the oven and passes out therefrom carrying the now finished baked loaves with it. After such emergence of each cradle from the oven the baked loaves are removed therefrom, and placed on a belt carrier $i$; the point or position for such removal can be at such a distance from the oven exit as will give time for sufficient cooling of the bread to permit of handling.

After discharge or removal of its baked contents, each shelf or cradle is carried, exteriorly to the oven, back to the proving chamber for taking up another charge of dough portions. At any convenient position during such passage the trays or tins are greased or prepared for the reception of the next charge of dough portions.

As the conveyer returns, in the direction indicated by the arrow at Fig. 1, over the top of the oven and proving chamber, it is prevented from undue sagging or deflection by supports as $j$.

The trays or sole plates for receiving the dough portions for cottage loaves or oven bottom bread, are carried by the same cradles, bridles or the like as are used for holding the tins in the making of tin loaves.

When making cottage loaves or oven bottom bread it is desirable, in order to give a rounded appearance to the bottom of the loaf, that the sole plates be heated before admission to the oven. For this purpose the conveyer $a$, as it travels from the prover to the oven, can be caused to pass through a gallery or conduit as $a^1$, located in the space between oven and prover, wherein high pressure gas jets or other heating elements are arranged for the heating up of the sole plates to the oven temperature or an approximation thereto. Or such heating of the sole plates may be effected, entirely or in part, within the proving chamber.

Variation of the time or period of proof may be provided by introducing the dough portions at a charging aperture $k$, at the opposite end of the prover to the charging aperture $g$ aforesaid, the dough portions being brought from the final prover to such position by the belt carrier $l$. A further variation of time of proof may also be obtained by adjustment of the position of the coupled guide wheels or pulleys $m$ and $n$. Thus, for example, if such coupled pulleys be moved to the left, the distance to be traveled through the prover by the dough portions will be reduced, and this will be so whether the charging is effected at the end $g$ or the end $k$ of the prover. If desired a similar device may be employed in the oven to provide for variations in the time of baking.

The speed at which the conveyer is driven may be varied to meet varying requirements.

To give convenient access to the guide wheels or pulleys in the oven or baking chamber $c$, apertures, with suitable doors or covers, are provided in the walls of the chamber. Provision is also made in any convenient manner, for maintaining the conveyer at the required degree of tension for convenient and efficient operation.

Both in the proving chamber and also in the oven or baking chamber the circuitous path of the conveyer may be mainly in a vertical or other direction than that of the horizontal as is illustrated by way of example in the figures.

Having thus described my invention what I claim as new and desire to secure by Letters Patent is:—

1. In bread making machinery, the combination with a final proving chamber and a baking chamber each of said chambers forming a separate and independent unit, of an endless conveyer for the dough portions, means whereby the said conveyer is caused to travel in a circuitous path through both of said chambers and to return exteriorly to the same from the outlet of the baking chamber to the inlet of the proving chamber, and means for varying the time of transit of the dough portions between the chamber entrance and exit apertures without varying the speed of the conveyer, as set forth.

2. In bread making machinery, the combination with a final proving chamber and a baking chamber each of said chambers forming a separate and independent unit, of an endless conveyer, means whereby the said conveyer is caused to travel in a circuitous path through both of said chambers and to return exteriorly to the same from the outlet of the baking chamber to the inlet of the proving chamber, and means for heating the conveyer sole plates, prior to entering the baking chamber, above the temperature of the proving chamber, as set forth.

In testimony whereof I have signed my name to this specification.

JOHN EDWARD POINTON.